(No Model.) 6 Sheets—Sheet 1.
G. S. BERRY.
COMBINED STEAM TRACTION HEADER AND THRASHER.
No. 374,339. Patented Dec. 6, 1887.
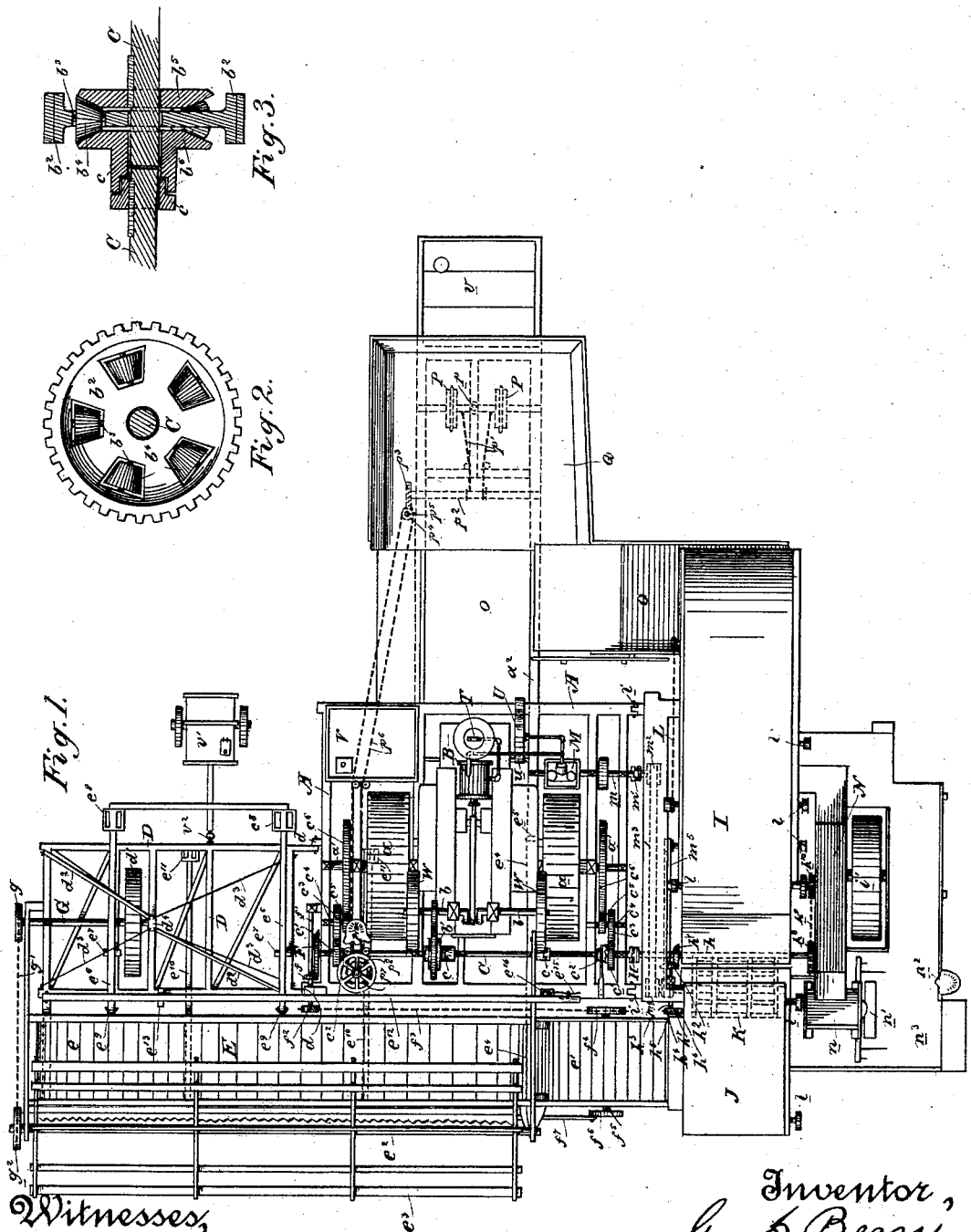

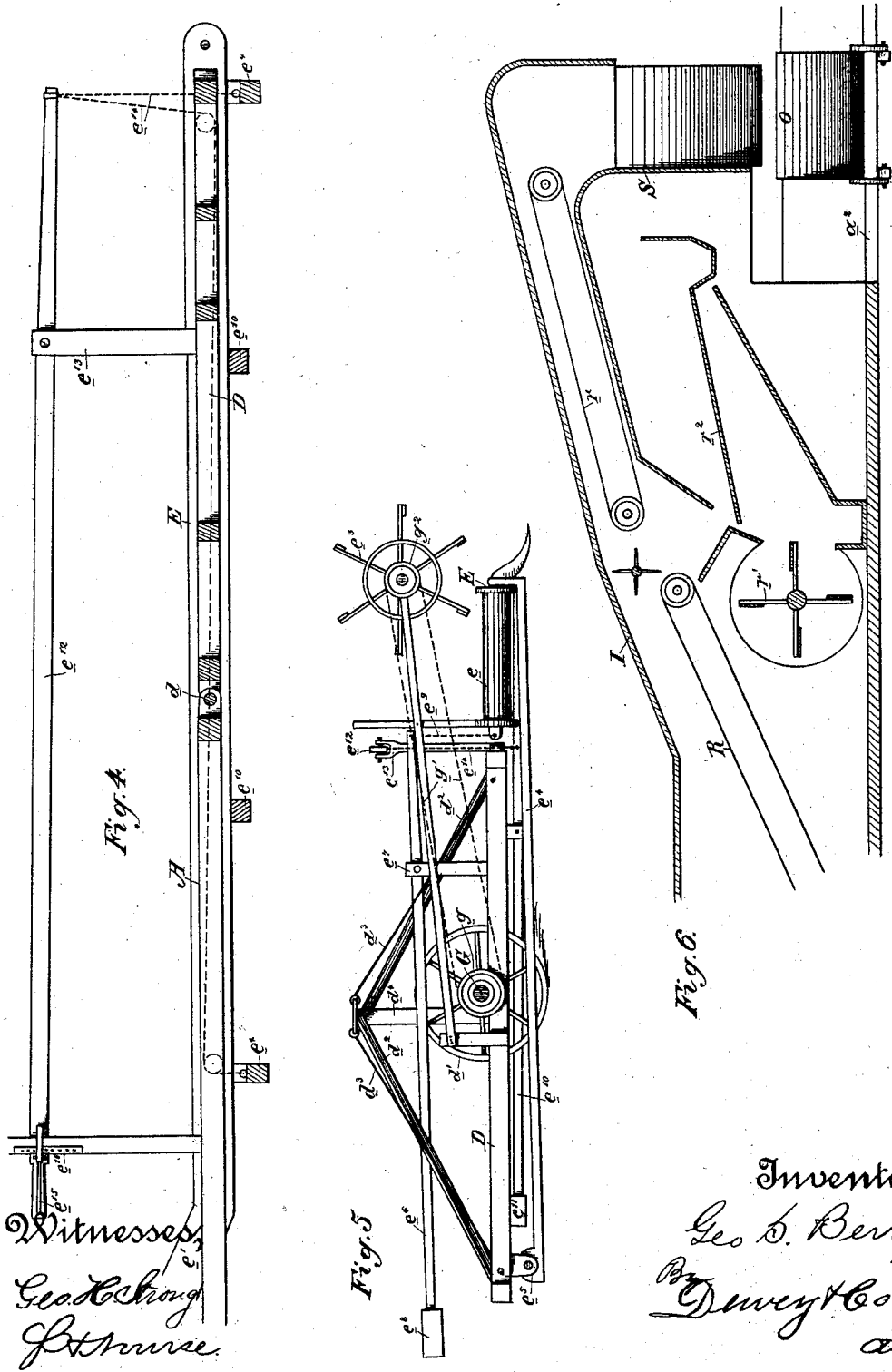

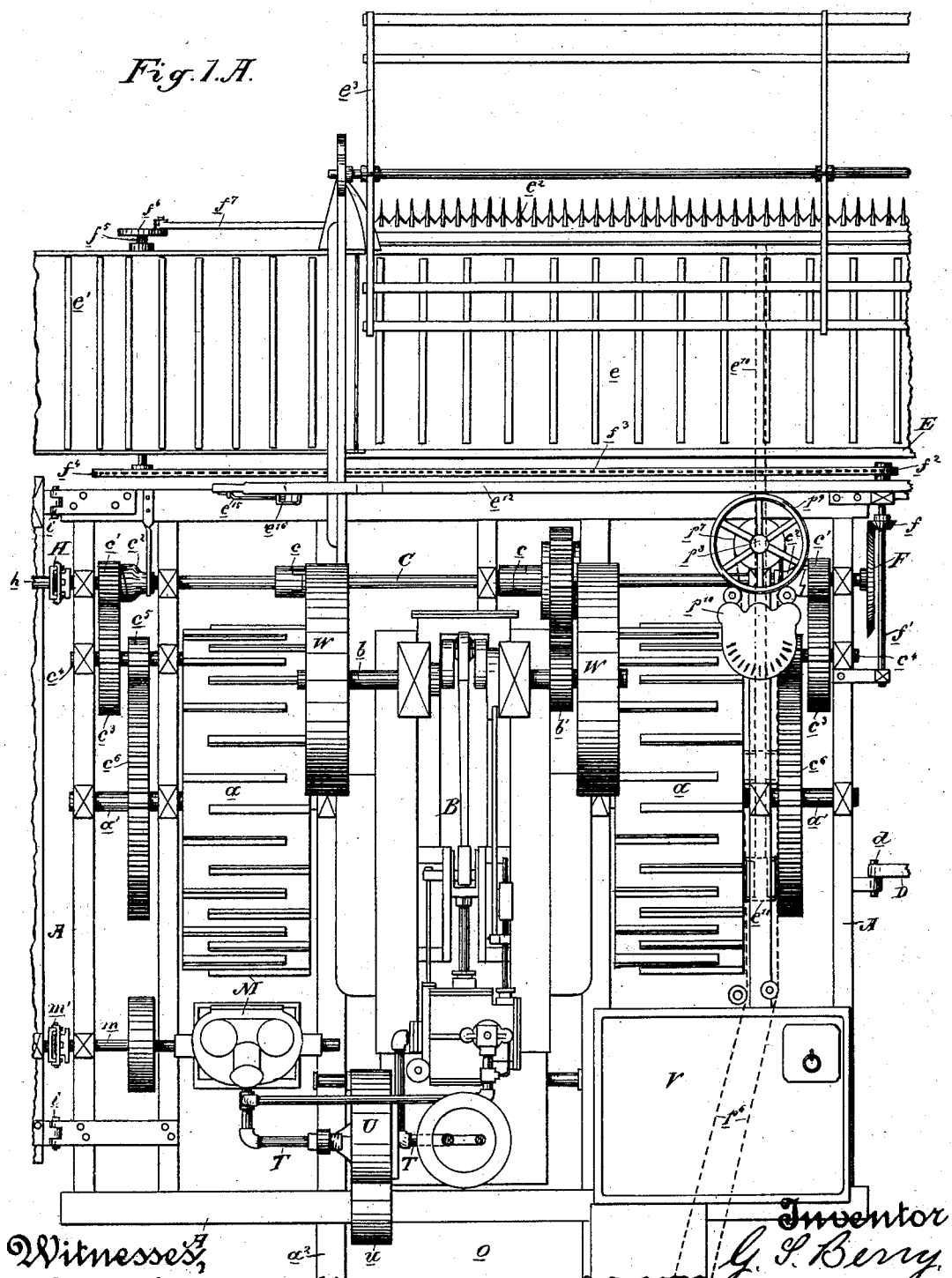

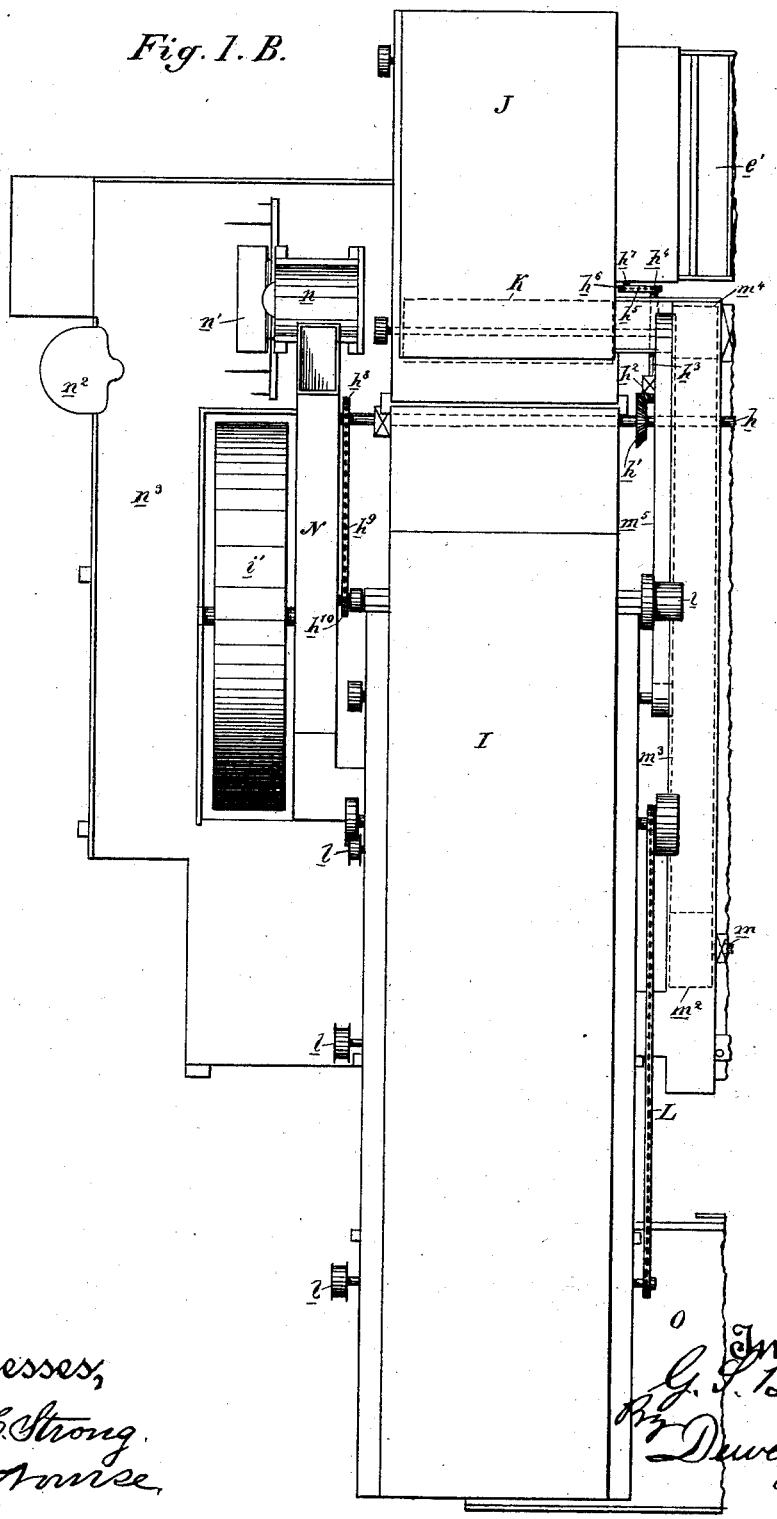

(No Model.) 6 Sheets—Sheet 5.
G. S. BERRY.
COMBINED STEAM TRACTION HEADER AND THRASHER.
No. 374,339. Patented Dec. 6, 1887.
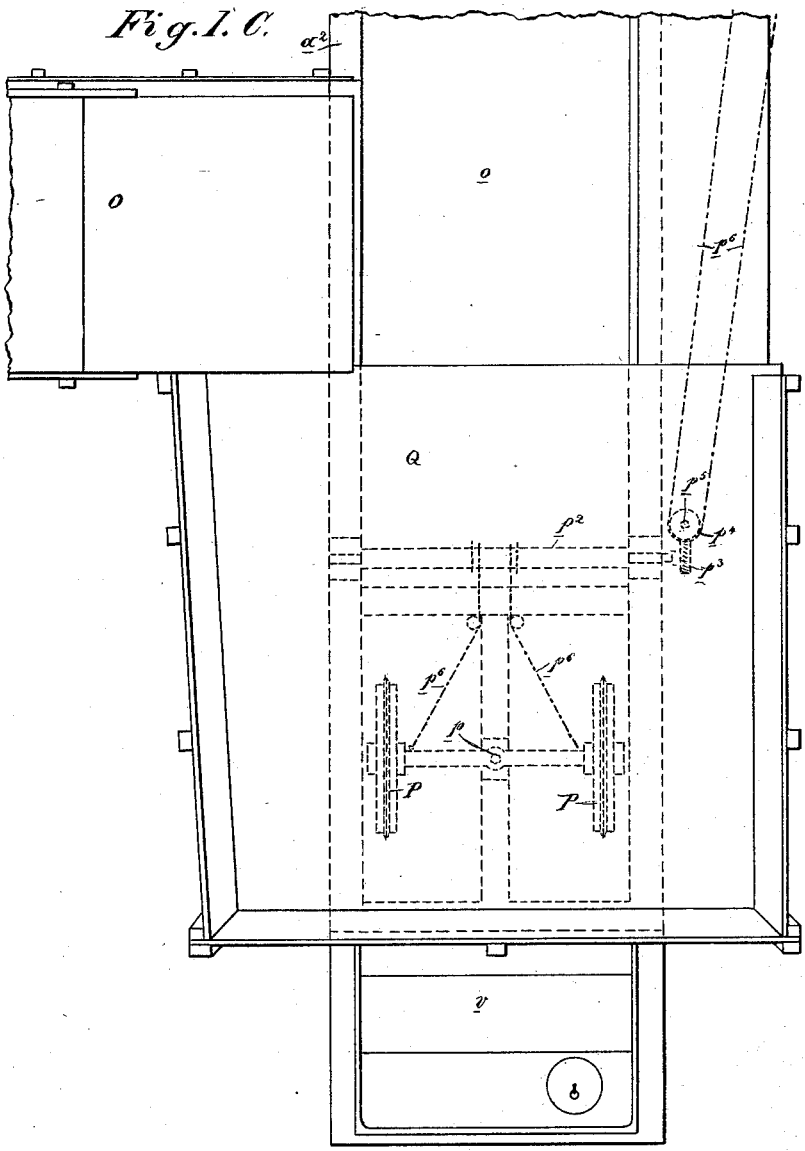

(No Model.) 6 Sheets—Sheet 6.
G. S. BERRY.
COMBINED STEAM TRACTION HEADER AND THRASHER.
No. 374,339. Patented Dec. 6, 1887.
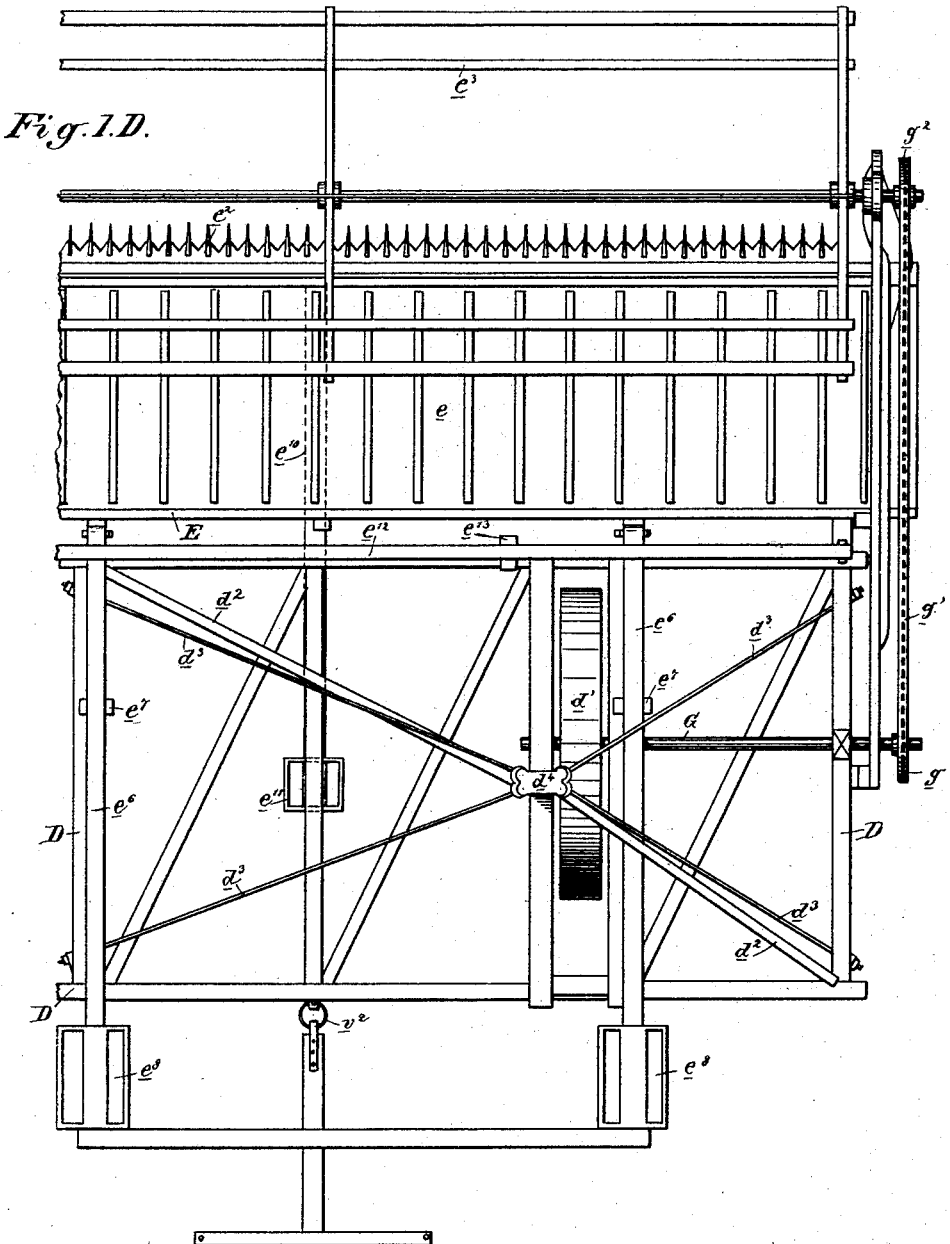

UNITED STATES PATENT OFFICE.

GEORGE STOCKTON BERRY, OF VISALIA, CALIFORNIA.

COMBINED STEAM TRACTION HEADER AND THRASHER.

SPECIFICATION forming part of Letters Patent No. 374,339, dated December 6, 1887.

Application filed September 7, 1886. Serial No. 212,960. (No model.)

*To all whom it may concern:*

Be it known that I, GEORGE STOCKTON BERRY, of Visalia, county of Tulare, and State of California, have invented an Improvement in Combined Steam Traction-Harvesters; and I hereby declare the following to be a full, clear, and exact description thereof.

My invention relates to that class of agricultural machines known as "combined harvesters and thrashers," and particularly to that class in which the power of the engine is directed not only to the operation of the several parts of the machine, but also to the progression of the machine.

My invention consists in the construction and combinations of devices, which I shall hereinafter fully describe and specifically claim.

Referring to the accompanying drawings, Figure 1 is a plan of my combined steam traction harvester and thrasher. Fig. 2 is a sectional elevation of a divided shaft and its gearing. Fig. 3 is a vertical section of the parts shown in Fig. 2, and with the line of section at right angles thereto. Fig. 4 is a longitudinal section of the draper-platform, showing adjusting-lever. Fig. 5 is a side elevation of the header portion. Fig. 6 is a vertical section of the thrasher. Fig. $1^A$ is a plan of the central portion or traction-engine of the machine. Fig. $1^B$ is a plan of the left-hand portion or thrasher of the machine. Fig. $1^C$ is a plan of the rear extension of the traction-engine. Fig. $1^D$ is a plan of the right-hand portion or harvester of the machine.

A is the frame of the traction-engine, consisting of suitable parallel longitudinal and transverse bars, and $a$ are the wheels on which the frame is mounted. These wheels are preferably ribbed, and have no further function than the supporting and progression of the machine. This progression is effected by means of the boiler and engine B, of any suitable pattern, preferably of that class known as "straw-burners." They are supported by the frame in such a manner that their weight is carried by and directly over the wheels $a$.

The crank driving-shaft $b$ of the engine is geared, as shown at $b'$, to the counter-shaft C. The particular construction of this gearing I shall presently fully explain. The shaft C is divided at $c$, its sections being tongued and grooved together, so that while having a flexible connection all the sections are compelled to turn together, rotating as an entire shaft. The object in thus jointing the shaft is to avoid the strain which would naturally occur in so long a shaft mounted in several boxes.

The shaft C is provided with loose pinions $c'$ near its ends, which are thrown in and out of clutch with the shaft by means of the feathered clutches $c^2$. Pinions $c'$ mesh with the gears $c^3$ on short counter-shafts $c^4$, which carry pinions $c^5$, meshing with gears $c^6$ on the axles $a'$ of the wheels $a$. The power of the engine is thus transmitted to the wheels $a$, which cause the progression of the machine.

The driving-power by which the progression of the machine is effected is transmitted from the engine through gears to the shaft C, and from said shaft through gears to the traction-wheels on each side. Now, if the shaft C were in one piece all the way across, it can readily be seen that while the machine would travel straight ahead it would be difficult, if not impossible, to make a turn, for, in order to accomplish this turn, one of the wheels must be independent of the other, so as to allow it to travel faster; but that a turn may be made the shaft C is not in one piece, but, as before stated, is in two pieces or sections, so that one section is independent of the other; but while this is true it is also evident that as the power must be transmitted through both sections of the shaft we must have some mechanism by which the power can be so transmitted and yet have the shaft sectional. The purpose, therefore, of the mechanism shown in Figs. 2 and 3 is to permit a turn to be made, while at the same time the power is transmitted equally through both sections of the shaft just as if no turn were being made. The gear $b^2$ is the one which receives its initial power from crank-shaft $b$. This gear is loose on the shaft C, and is located upon one of its sections. Upon the same section is keyed fast the gear $b^5$, and upon the same section, but nearer the end, is mounted loosely the gear $b^6$, but which has a clutch-hub, which by engaging the clutch upon the end of the adjacent section practically makes said gear $b^6$ fast upon said adjacent section. The gear $b^2$ has a number of conical pinions $b^4$, located in radial planes of the gear and each mounted upon its own axis, so that in addition to the revolving motion of the entire series of conical pinions $b^4$, which is had through the rotation of the gear $b^2$, which carries them, each pinion has an axially-rotary motion of its own. These pinions engage on each side with the gears $b^5$ and $b^6$. Now, when the machine is moving straight ahead the pinions $b^4$ act as locks between the gear $b^2$, which receives the power, and the gears $b^5$ and $b^6$ on the respective sections of the shaft C, and therefore said gears are driven, the pinions $b^4$ remaining stationary on their own axes, but revolving of course with the gear which carries them; but when a turn is made one wheel has to travel faster than another, and consequently one section of the shaft C has to travel faster than the other and its gear has to move faster than the gear of the other section. This is permitted by reason of the pinions $b^4$, which, when thus required, turn slightly on their own axes in order to accommodate the faster-moving gear on one side, while they still act as locks to transmit the power to the two gears.

D is the header-frame. This is connected by hinges $d$ with the side of the frame A of the traction-engine, and its outer side is supported and carried by the wheel $d'$. It is braced by means of inclined beams or timbers $d^2$ and inclined upwardly-converging rods $d^3$, which meet and are secured to a vertical standard, $d^4$. Thus braced, the frame is prevented from warping or otherwise getting out of its proper shape. By being hinged at its inner side to the traction-engine frame it is not only supported at that side, but is also allowed to have its motion independent of said traction-engine frame, so that it will conform itself to the inequalities of the ground.

E is the draper-platform, carrying the draper $e$ and the elevator $e'$, the sickle $e^2$, and the reel $e^3$, and such other parts as are accessory thereto. This platform is supported and adjusted in the following manner, (see Fig. 5:)

Secured to the platform at each end are arms $e^4$, which extend backwardly under the header-frame and under the frame A of the traction-engine, and are pivoted at their rear ends to said frames, as shown at $e^5$. Levers $e^6$ are fulcrumed on the standards $e^7$ on the top of the header-frame, their rear ends carrying balancing-weights $e^8$, and their forward ends are connected by chains $e^9$ with the rear bar of the draper-platform. Bars or arms $e^{10}$ are rigidly secured under the draper-platform and across its entire width, and thence extend backwardly under the header and the traction-engine frames, though without being connected with either, and carry on their rear ends weights $e^{11}$. An operating-lever, $e^{12}$, is fulcrumed or pivoted on a standard, $e^{13}$, on the front of the header-frame, and is connected by chains $e^{14}$ with the end arms, $e^4$, of the draper-platform. A pawl, $e^{15}$, and rack $e^{16}$ hold the lever to the position adjusted, Fig. 4.

The function of these parts is as follows: The end arms, $e^4$, connect the draper-platform with the frames behind it by a pivot-connection, which permits of its vertical adjustment. The operating-lever $e^{12}$, through its chains $e^{14}$, accomplishes the vertical adjustment of the platform for the high or low cut, as may be desired. The weighted levers $e^6$ balance the platform and render it easy to operate, and the weighted arms $e^{10}$ hold the platform level.

The various parts of the header are operated by the following means, by power transmitted from the engine B: The counter-shaft C carries on its right-hand end a beveled gear, F, which meshes with a beveled pinion, $f$, on a counter-shaft, $f'$, which carries a sprocket-wheel, $f^2$, from which an endless chain, $f^3$, extends to a sprocket-wheel, $f^4$, on a shaft, $f^5$, the other end of which has a crank, $f^6$, from which a pitman, $f^7$, extends to and operates the sickle $e^2$. The axle G of the header-frame wheel $d'$ has on its outer end a sprocket-wheel, $g$, from which an endless chain, $g'$, extends to a sprocket-wheel, $g^2$, on the shaft of the reel $e^3$, whereby said reel is driven. The left-hand end of the counter-shaft C is connected by a common universal joint, H, with a shaft, $h$, extending to the left under the thrasher. This shaft carries a beveled gear, $h'$, which meshes with a beveled pinion, $h^2$, on a shaft, $h^3$, the forward end of which carries a sprocket-wheel, $h^4$, from which an endless chain, $h^5$, extends to a sprocket-wheel, $h^6$, on the shaft $h^7$ of the upper drum of the elevator $e'$, whereby the draper $e$ is driven.

I is the thrasher. This is on the left-hand side of the traction-engine frame A, and its inner side is attached to said frame by the hinges $i$, whereby it accompanies the traction-engine, but still has its independent motion, enabling it to conform itself to the ground over which it travels.

The universal joint H is for the purpose of permitting this independent motion, and at the same time transmitting power to the thrasher. The outer side of the thrasher is supported upon and carried by a wheel, $i'$.

J indicates the self-feeder of the thrasher, with which the elevator-spout $e'$ of the header is in communication.

K is the cylinder of the thrasher.

The shaft $h$, heretofore mentioned, and which extends under the thrasher, is provided on its outer end with the sprocket-wheel $h^8$, from which a chain, $h^9$, extends to a sprocket-wheel, $h^{10}$, for driving the beaters of the thrasher.

L is an endless chain for driving the endless apron-platform and straw-carrier of the thrasher, said parts being operated from the engine B through the counter-shaft C and connection.

$l$ indicates pulleys, from which belts extend in order to drive the several parts. The elevator and the riddle are also to be driven from engine B. The cylinder, the feeder, the fan, and the pickers of the thrasher are, however, driven by means of an engine independent of that which operates the other parts of the machine. This engine is designated by M, and is located upon the frame A of the traction-engine. Its drive-shaft $m$ has a universal joint, $m'$, so as not to interfere with the independence of the thrasher, and the outer end of this shaft carries a pulley, $m^2$, from which an endless belt, $m^3$, extends to the pulley $m^4$ of the cylinder.

From the cylinder the fan-shaft is operated by means of the belt $m^5$, and the feeders and pickers are to be operated in suitable manner from the engine M. The object of this construction is to enable me to drive certain parts of the thrasher, especially the cylinder and fanning-mill, at a uniform speed, and not make them dependent upon the speed of the main engine, which latter is regulated not only by the necessities of the operating parts of the machine, but by its progression as well. This would render the operation of the thrashing-cylinder and other parts requiring uniformity of speed irregular, which is not to be desired, as I find that a certain and constant rate of speed will dispose of the material to the best advantage.

N is the elevator by which the thrashed grain is taken up to the hopper $n$, from whence it is discharged to the sacker $n'$ within reach of the operator's seat $n^2$ on the platform $n^3$. At the rear end of the thrasher is a chute, O, hinged at its lower end to the rear extension, $a^2$, of the frame A. Its upper end is in communication with the straw-carrier of the thrasher, and receives the straw therefrom, conveying it down upon the platform $o$ of the extension of the frame A, and upon which the engineer stands, whereby the straw is in convenient position to be fed to the furnace. The rear extension of the frame is supported by the steering-wheels P, the truck of which is pivoted at $p$, and these wheels are operated by means of chains $p'$, oppositely wound upon a shaft, $p^2$, the end of which carries a worm-gear, $p^3$, with which a worm, $p^4$, engages, said worm being upon a vertical spindle, $p^5$, from which chains $p^6$ extend forwardly, guided by suitable pulleys, to a pulley, $p^7$, on a vertical spindle, $p^8$, provided with a crank-wheel, $p^9$, within reach of the seat $p^{10}$.

On the rear extension of the frame is formed a receptacle or storage-compartment, Q, wherein the surplus straw is contained, the front of said receptacle being open to the engineer's platform $o$, so that he may readily reach its contents. When he is receiving too much straw for the time being, the hinged chute O may be turned to a vertical position, whereby the straw is discharged by the straw-carrier directly upon the ground. It is of prime importance that this straw, which is used for fuel, should be kept as clean as possible from dust, and also that the dust and chaff which the fan usually blows from the riddle should be kept from passing out at the rear of the thrasher, where it would interfere with the workmen.

In order to keep the dust from the straw I have the partition S. (Shown in Fig. 6.) The partition S, located between the rear end of the shoe or riddle and the rear end of the straw-carrier, remedies this defect and causes the dust and chaff to be discharged directly downward and free of the straw, which is discharged behind the partition.

Both engines B and M exhaust into the stack of the main boiler, as shown by the pipes T, and in order to accelerate the combustion in the furnace I have a fan-blower, U, which is driven by suitable power-transmitting devices from the engine B, and communicates by the wind-pipe or chute $u$ with the space under the grate-bars, whereby a blast of air is introduced.

The supplementary engine M is operated by steam taken from the boiler of the main engine.

V is a water-tank on one corner of the frame A. $v$ is another water-tank on the extreme end of the rear extension of said frame, and $v'$ is a wheeled water-tank connected by a removable clevis, $v^2$, with the rear of the header-frame. These tanks by means of suitable connecting-pipes supply water to the boiler.

Clutches may be provided wherever deemed desirable for throwing the different parts into and out of engagement.

W are fly-wheels on the driving-shaft of the main engine.

The operation of my machine is as follows: The progression of the entire machine is effected wholly from the main engine by means of power transmitted to the traction-wheels $a$, which, as I have heretofore mentioned, serve no other purpose than that of supporting the machine and of causing its progression. They transmit no power to operate the parts of the machine. In the progression of the machine the hinged header-frame on one side and the hinged thrasher on the other have their own independent motion, and do not, therefore, cramp, whatever may be the character of the ground over which they pass. The draper-platform with all its parts is adjusted easily and conveniently, being kept level in all positions. The course of the grain is the usual one, and needs no detailed description. The straw is discharged at the rear end free of dust and chaff, and is carried by the chute O down to the platform where the engineer stands, and the surplusage is stored in the receptacle Q.

The whole machine is readily steered from the seat $p^{10}$.

Having thus described my invention, what I claim as new, and desire to secure by Letters Patent, is—

1. A harvesting mechanism comprising an independent frame mounted upon a wheeled base, a reciprocating sickle at the front of the frame, a carrier-belt by which the cut grain is transmitted, and a reel by which the cut grain is directed upon the carrier, a thrashing mechanism comprising an independent frame mounted upon a wheeled base, a thrashing-cylinder, grain and straw carriers, and cleaning devices, said thrashing mechanism being arranged with relation to the harvesting mechanism, so that the grain is delivered to the cylinder of the thrasher, in combination, with a centrally-disposed engine mounted upon traction bearing-wheels, and hinged to the harvester and thrasher frames at opposite sides, so as to propel the two simultaneously over the ground and drive their operating mechanism in unison, substantially as herein described.

2. A combined steam traction-harvester consisting of an engine mounted on a frame on traction bearing-wheels, a harvesting mechanism comprising a frame hinged to one side of the engine-frame, a sickle for cutting the grain, a reel for directing it and a belt for transmitting it, a thrashing mechanism comprising a frame hinged to the opposite side of the engine-frame, a thrashing-cylinder arranged to receive grain from the carrier of the harvesting mechanism, grain and straw carriers and cleaning and sacking devices, and power-transmitting mechanism from the engine, by which the machine is enabled to control its own progression and operate its several parts, whereby the grain is cut, thrashed, cleaned, and sacked, substantially as herein described.

3. In a combined steam traction harvester and thrasher, the combination of a traction-engine, a frame hinged thereto, and having a sickle, draper, or carrier and other parts of a harvester, and a draper-platform which extends in front of and is connected with both the harvester-frame and traction-engine frame, and a frame hinged to the traction-engine frame and carrying a thrashing-cylinder in communication with the draper of the harvester and other parts of a thrashing-machine, substantially as herein described.

4. In a combined steam traction harvester and thrasher, the combination of a central traction-engine, a header-frame hinged to one side of the frame of said engine and having its outer side carried by its own wheel, the draper-platform connected with the front of the traction-engine frame and the header-frame, and the thrasher hinged to the other side of the traction-engine frame, and having its outer side carried by its own wheel, substantially as described.

5. In a combined traction harvester and thrasher, the combination of a central traction-engine, a wheeled harvester-frame hinged to one side of the traction-engine frame, and having its draper-platform extending in front of and connected with both the harvester-frame and the traction-engine frame, and carrying a sickle, reel, draper, and elevator, a wheeled frame hinged to the other side of the traction-engine frame and carrying a thrashing-cylinder, feeder, and other parts of a thrashing-machine, said feeder communicating with the elevator of the harvester, and a chute between the rear end of the thrasher and the traction-engine frame, whereby the straw is conveyed to and upon said latter frame, substantially as herein described.

6. In a combined steam traction harvester and thrasher, a central main frame having wheels, and a boiler and engine, from the latter of which power is transmitted to the wheels by which the progression of the machine is effected, and steering-wheels by which the main frame is guided, in combination with the wheeled header-frame hinged to one side of the main frame and having its draper-platform hinged to the front of the frame and to the header-frame, said header-frame carrying a sickle, draper, and reel, and a wheeled thrashing mechanism hinged to the other side of the main frame, substantially as herein described.

7. In a combined steam traction harvester and thrasher, the central main frame having supporting and driving wheels and an engine and boiler, and mechanism by which the power of the engine is transmitted to the wheels for effecting the progression of the machine, in combination with a frame hinged to one side of the main frame and carrying a draper and sickle and other parts of a harvester, said frame having a draper-platform connected to the front of the main frame and to its own frame, transmitting mechanism from the engine on the main frame to drive the draper and sickle of the harvester, and a thrasher-frame hinged to the opposite side of the central main frame, substantially as herein described.

8. In a combined steam traction harvester and thrasher, the wheeled frame A, having boiler and engine, and transmitting mechanism to the wheels, whereby the frame is progressed, in combination with the header-frame D, hinged to the side of frame A, the draper-platform E, and the draper $e$ and elevator $e'$, and the means for driving said draper from the engine, consisting of the counter-shaft C, geared to the engine-shaft, the extension-shaft $h$, jointed to said counter-shaft, the beveled gears $h'$ $h^2$, the shaft $h^3$, the sprocket-wheels $h^4$ $h^6$, and endless chain $h^5$, substantially as described.

9. In a combined steam traction harvester and thrasher, a wheeled frame, a boiler and engine carried thereby, and power-transmitting mechanism from the engine to the wheels, whereby the progression of the frame is effected, in combination with a harvester hinged to one side of said frame, a thrasher hinged to the other side of the wheeled frame, and power-transmitting mechanism, whereby the engine drives the beaters, grain and straw carriers, elevator, and riddle of said thrasher, substantially as described.

10. In a combined steam traction harvester and thrasher, the main wheeled frame A, the engine and boiler thereon, and power-transmitting mechanism from the engine to the wheels, whereby its progression is effected, in combination with the wheeled thrasher I, hinged to one side of the main frame, and the means for driving its beaters, grain and straw carriers, elevator, and riddle, consisting of the counter-shaft C, geared to the engine-shaft, the shaft $h$ under the thrasher and jointed to said counter-shaft, and suitable belts or chains and pulleys, by which the power of shaft $h$ is transmitted to the several parts, substantially as described.

11. In a combined steam traction harvester and thrasher, the frame A and an engine carried thereby, whereby its progression is effected, in combination with the thrasher I, connected with the frame A, a supplementary engine, M, and power-transmitting devices from said last-named engine to the cylinder of the thrasher, whereby it is driven at a uniform rate independent of the progression of the machine, substantially as described.

12. In a combined steam traction harvester and thrasher, the main wheeled frame A, having a boiler and engine, B, by which its progression is effected, in combination with the thrasher I, hinged to one side of the main frame, the cylinder K of the thrasher and the means for operating it, consisting of the supplementary engine M on the main frame, the jointed drive-shaft $m$ thereof, the pulleys $m^2$ $m^4$, and endless belt $m^3$, substantially as described.

13. In a combined steam traction harvester and thrasher, a wheeled frame, a boiler and engine carried thereby, power-transmitting mechanism from the engine to the wheels, whereby the progression of the frame is effected, and a supplementary engine on said frame, in combination with a thrasher hinged to one side of the frame, power-transmitting mechanism, whereby the main engine drives the beaters, grain and straw carriers, elevator, and riddle of the thrasher, and power-transmitting mechanism by which the supplementary engine drives the cylinder, feeder, fanning-mill, and pickers of said thrasher, substantially as described.

14. In a combined steam traction harvester and thrasher, a central frame, A, mounted on wheels $a$, a boiler and engine, B, on said frame, and power-transmitting mechanism by which the wheels are driven for the progression of the machine, in combination with the header-frame D, hinged to one side of the frame A, the draper-platform E and its accessories, connected at the front of said frame and the header-frame, power-transmitting mechanism from the engine B, by which parts of the header are driven, the thrasher I, hinged to the other side of the frame A, power-transmitting mechanism by which the engine B drives certain of the parts of the thrasher, a supplementary engine, M, on the main frame A, and power-transmitting mechanism from said engine to the cylinder of the thrasher, whereby it is driven independently of the progression of the machine, substantially as described.

15. In a combined steam traction harvester and thrasher, the main frame A, having wheels $a$ and steering-wheels, and the boiler and engine B, supported upon said frame, having a drive-shaft, $b$, with gears $b'$, in combination with the jointed counter-shaft C, geared to the drive-shaft, the loose pinions $c'$, clutches $c^2$, gears $c^3$, shafts $c^4$, pinions $c^5$, and gears $c^6$ on the wheel-axles, whereby said wheels are driven, substantially as herein described.

16. In a combined steam traction harvester and thrasher, the mechanism interposed in the chain of power-transmitting gears and shafts from the engine to the propelling-wheels, whereby the strain in turning is equalized, consisting of the sectional counter-shaft C, having the engaging-clutches $c$, the one fast on one section and the other loose on the adjacent section, the bevel-gear $b^6$, loose on said section and connected with the clutch thereon, the beveled pinion $b^5$, fast on said section, the intervening gear $b^2$, loose on the shaft C, and the loosely-mounted pinions $b^4$, carried by said gear and engaging the gears $b^5$ $b^6$, substantially as herein described.

17. In a combined steam traction harvester and thrasher, the main frame A, having a boiler and engine by which its progression is effected, and a platform, $o$, at its rear, for receiving the straw from the accompanying thrasher, in combination with the header-frame D, hinged to one side, the draper-platform at the front of the header-frame and main frame, the thrasher hinged to the other side of the main frame and with the self-feeder of which the elevator of the header communicates, and the chute O at the rear end of the thrasher, communicating at its upper end with the straw-carrier thereof and at its lower end with the platform $o$ at the rear of the main frame, substantially as herein described.

18. In a combined steam traction harvester and thrasher, the main wheeled frame A, having a boiler and engine by which its progression is effected, and a platform, $o$, at the rear, in combination with the thrasher I on one side of the main frame, and the hinged chute O, having its lower end in communication with the platform $o$ and its upper end movable into and out of communication with the straw-carrier, whereby the straw may be discharged upon the platform or directly upon the ground, substantially as herein described.

19. In a combined steam traction harvester and thrasher, the traction-engine frame A, having a platform, $o$, at its rear, for receiving the straw from the accompanying thrasher, and a storage-receptacle, Q, behind said platform, for receiving the straw for fuel, in combination with the thrasher I on one side of the main frame, and the spout or chute O, for discharging the straw upon the platform, substantially as herein described.

20. In a combined steam traction harvester and thrasher, the traction-engine frame A, having a platform, $o$, at its rear, in combination with the thrasher I on one side, and the chute O, in communication with the straw-carrier of the thrasher and with the platform, and a partition, S, in the thrashing-machine between the rear end of the riddle thereof and the rear end of the straw-carrier, whereby the dust and chaff are directed downwardly and prevented from mixing with the straw, substantially as described.

21. In a combined steam traction harvester and thrasher, the wheeled frame A of the traction-engine and the header D, hinged to one side, in combination with the draper-platform E, and the mechanism by which it is supported and adjusted, consisting of the arms $e^4$, secured to the platform and pivoted under the traction-engine frame and header-frame, the pivoted and weighted balancing-levers $e^6$, the underlying weighted leveling-arms $e^{10}$, secured to the draper-platform and passing loosely under the frames behind, and the pivoted operating-lever $e^{12}$, connected with the arms $e^4$ of the draper-platform, substantially as described.

In witness whereof I have hereunto set my hand.

GEORGE STOCKTON BERRY.

Witnesses:
S. H. NOURSE,
H. C. LEE.